UNITED STATES PATENT OFFICE.

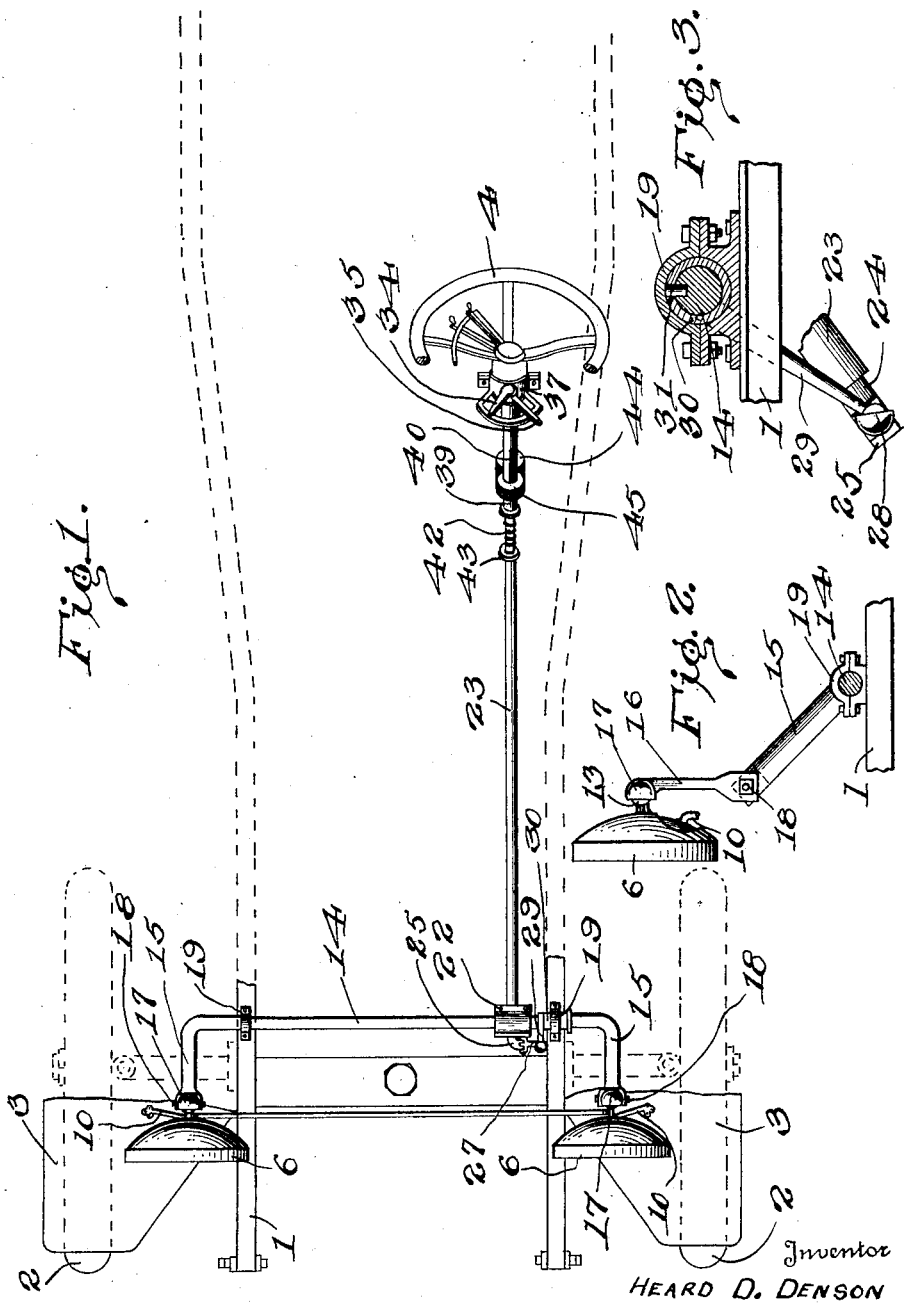

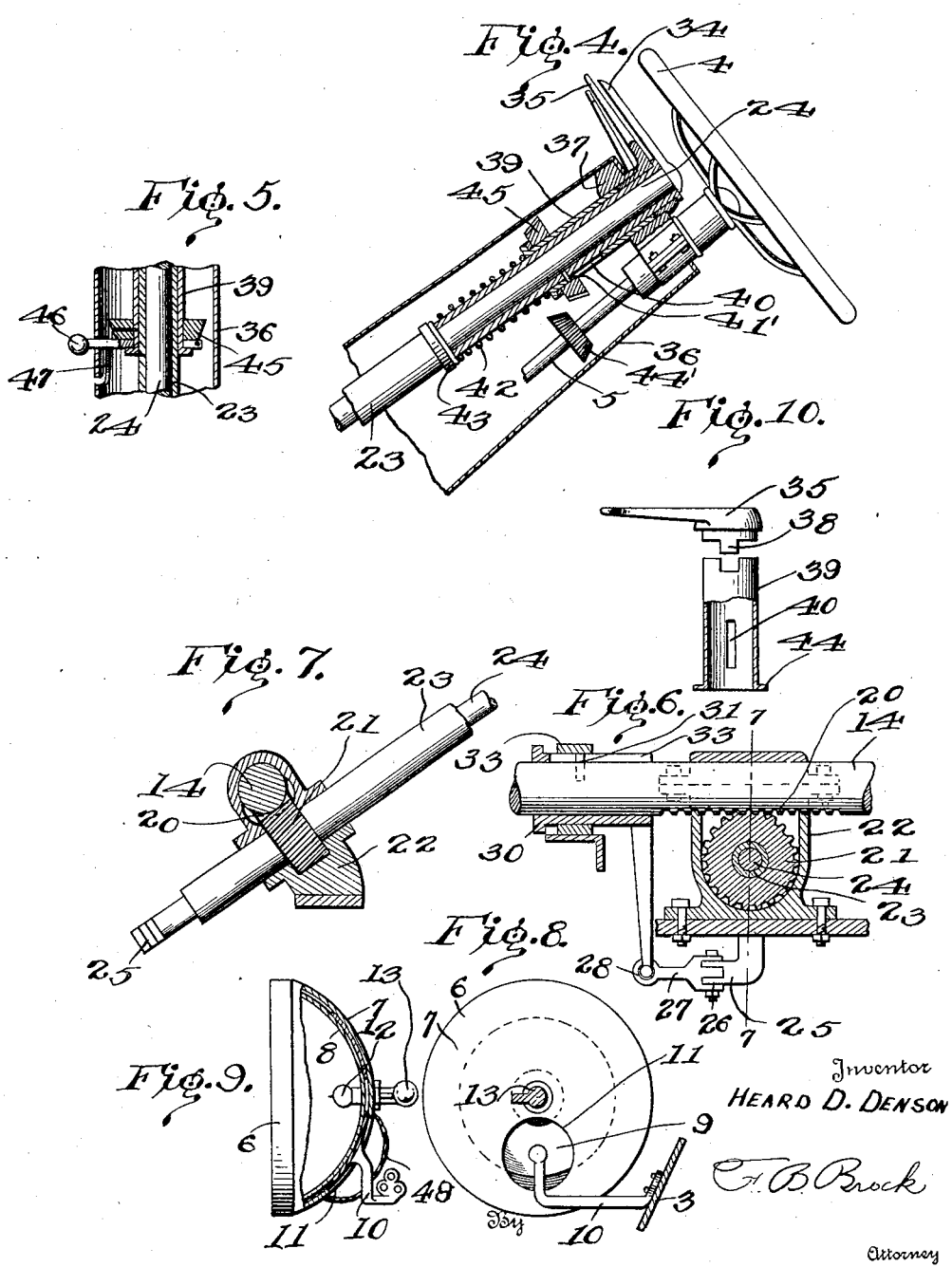

HEARD D. DENSON, OF MIAMI, FLORIDA, ASSIGNOR TO MILBURN C. WEAVER, OF MIAMI, FLORIDA.

DIRIGIBLE HEADLIGHT.

1,387,478.   Specification of Letters Patent.   Patented Aug. 16, 1921.

Application filed August 27, 1919. Serial No. 320,115.

*To all whom it may concern:*

Be it known that I, HEARD D. DENSON, a citizen of the United States, residing at Miami, in the county of Dade and State of Florida, have invented new and useful Improvements in Dirigible Headlights, designed particularly for use on automobiles or automobile trucks and operated through the utilization of control means at the steering wheel of the automobile.

By the utilization of my invention the headlights, which are carried at the usual place or position at the front of the vehicle, may be swung to the right or left through connections operated by the turning of the steering wheel, or both a vertical swing and a horizontal swing of the lamps may be accomplished through separate lever controls, and by the combined action of the lever controls the lamps may be swung to the right and down or to the left and upwardly, thus giving a wide radius of movement for the lamps in order to adapt them for their purpose.

In the accompanying drawings one complete example of the physical embodiment of the invention is illustrated, the parts being combined and arranged according to the best mode so far devised for the practical application of the principles of the invention.

Figure 1 is a plan view showing so much of the automobile as is necessary to give a general idea of the application thereto of the present invention.

Fig. 2 is a detail view showing the connections to the lamp for imparting vertical movement thereto.

Fig. 3 is a detail sectional view of the bearing and actuating arm connected to the operating bar.

Fig. 4 is a detail view showing the steering post and operating rod or bar for the lamps, and showing the beveled gear connection for vertically adjusting the lamps, also showing the hand levers and connections for vertical and horizontal adjustment.

Fig. 5 is a detail sectional view of the locking device for the operating tube or sleeve which coacts with the steering post for horizontal movement of the lamp.

Fig. 6 is a detail sectional view showing the rack connection between the operating bar and the rock bar for the lamps.

Fig. 7 is a sectional view at line 7—7 in Fig. 6.

Fig. 8 is a view at the rear of one of the lamps showing its bracket.

Fig. 9 is a side view of a lamp partly broken away to show the bracket plate which supports the lamp.

Fig. 10 is a detail of the clutch and lever for turning the lamps vertically.

In the preferred embodiment of the invention as illustrated in the drawings I have shown enough of the automobile to indicate the relation thereto of the invention.

In Fig. 1 the frame is indicated by the numeral 1, the front wheels of the automobile are designated as 2, and the wheel guards or mud guards are indicated by the numeral 3.

In Fig. 4, and also in Fig. 1, the steering wheel 4 is shown in connection with the steering post 5, and the lamps 6, 6 form one of the essential features of the invention as will be hereinafter pointed out.

Each lamp 6 is provided with an outer casing 7 and an inner reflecting shell 8, and these two elements, which are hemispherical, are spaced apart to accommodate the supporting head or bracket 9. The head 9 is a cup shaped disk conforming to the contour of the inner walls of the casing and shell, and the disk is integral with the bracket arm 10 which is fastened to the mud guard 3 over the front wheel 2. A circular opening 11 is provided at the rear of the lamp casing for the bracket arm 10, and the bulb 12 is of usual construction and has suitable wire connection which, however, forms no part of the present invention.

At the rear and center of the lamp a ball 13 is fashioned by which connection is made so that universal movement may be imparted to the lamp. Thus the lamp may be swung vertically, it may be swung in a horizontal plane, or the lamps may be swung to the right and downwardly or the left and upwardly.

The two lamps are complementary in their construction, and are connected together to operate simultaneously, and the lamps may be operated in a horizontal plane automatically in connection with the steering post and wheel of the automobile, or the operating parts of the dirigible light may be disconnected from the steering mechanism, and operated by levers provided for the purpose.

The two lamps are connected by the transverse actuating bar 14, which has a pair of end crank arms 15, and each arm 15 is connected by a link 16 fashioned with a socket 17 to the ball or head 13 of the lamp, the crank arm and link being pivoted at 18, as in Fig. 2. The actuating bar 14 is journaled in bearings 19, 19 on the frame of the automobile, and is capable of a rocking or oscillating movement to impart a vertical movement to the lamp, and also is capable of a longitudinal movement to impart a horizontal movement to the lamps. Thus in Figs. 6 and 7 particularly, the actuating bar 14 is provided with rack teeth 20 extending transversely thereof, and these teeth are engaged by the rack wheel 21, the whole being surrounded by a housing 22 which is suitably supported from the frame of the machine. The wheel 21 is fixed to and rotatable with the rotatable tubular casing 23 supported in the housing 22, and this casing incloses the operating shaft 24 by means of which vertical movement is imparted to the lamps. At its lower end, shaft 24 has a bent arm 25 which is pivoted at 26 to a link 27, and this link is pivoted at 28 to an arm 29 integral with the sleeve 30 on the actuating bar 14, all as best seen in Fig. 6. The sleeve 30 is connected with the actuating bar 14 by a pin 31 and the open slot connections 32, a band or ring 33 being employed to support the pin. Thus it will be seen, especially in Fig. 6, that the actuating bar may be moved transversely with relation to the sleeve 30, but that the sleeve must turn or revolve with the actuating bar 14 as it is oscillated, or rocked from the operating shaft 24, through its connections 25, 26, 27, 28, and 29.

The operating shaft 24 and its tubular casing are free to move in their relation to each other, and they are turned by their respective levers 34 and 35 as best seen in Fig. 4, and these levers are located in position with relation to the steering wheel so that they are accessible, and may be operated with facility by the driver of the car. A casing or housing 36 incloses the upper end of the shaft and tubular casing, and also the upper end of the steering post, and the operating shaft and its tube are supported in bearings 37 in the upper end of the housing. The lever 34 is connected directly to its operating shaft 24 to move the lamps in a vertical plane, but the lever 35 is provided with a clutch 38 so that it may engage or be disengaged from the thimble 39 slidable on the tubular casing 23. Thus the thimble which is provided with a slot 40 is connected to revolve with the tubular casing 23 by means of the pin 41, but the thimble 39 may be moved longitudinally or lengthwise of the tubular casing against the tension of a spring 42 which is interposed between a collar 43 on the tube 23, and an annular flange 44 on the thimble 39. Thus it will be seen that the thimble is normally held in engagement with the lever 35 by the spring 42, in order that the tubular casing may be turned by manipulation of its levers 34.

The lamps may be swung horizontally by automatic action from the steering wheel and post through the bevel gear 44' on the post and a similar bevel gear 45 on the thimble 39, the thimble of course being fixed to the gear. Thus the thimble with its gear, through the slot and pin construction 40—41 may be moved down on the tubular casing 23 by pressure on the handle 46 in Fig. 5, which handle travels in the U-shaped slot 47 of the housing 36, and may be locked in extreme positions when located in the bent ends of the slot 47.

As before stated, by turning the lever 34 the lamps may be moved in a vertical plane, with the clutch 39 closed and the handle 46 in the upper end of the slot 47 as in Fig. 5, the lamps may be turned in a horizontal plane by the lever 35, and by grasping both levers in the same hand and turning them simultaneously to the right, the lamps will be moved to the right and downwardly, while turning both levers to the left, the lamps will be swung to the left and upwardly.

By pushing down on handle 46, the bevel gears 44' and 45 may be engaged, and then the handle 46 locked, so that the lamps are permanently arranged to operate automatically in connection with the steering wheel 4 and post 5, and thus the lamps do not require the attention of the driver, but follow the movement of the steering apparatus and automatically illumine the road in line with the front wheels of the car. At the same time the lamps may be adjusted or moved vertically by means of the lever 34, without disturbing the relationship between the dirigible head lights and the steering wheel and posts.

A freedom of movement for the lamps is accomplished so that they may be swung around on their bracket plates or bracket heads in many different angles with regard to the vertical and horizontal. If necessary, a protecting cloth 48 may be attached around the opening 11 (see Fig. 9) in order to keep out moisture or dust, which might otherwise interfere with the movement of the lamp on its bracket head.

What I claim is:

1. The combination in a dirigible light with a fixed bearing head, of a movable lamp fashioned with rigid outer and inner shells forming a casing and reflector, to co-act with said head, and means for imparting universal movement to said lamp relative to the head.

2. The combination in a dirigible head light with a fixed bracket and open center bearing head, of a lamp having a rear opening for the bracket and comprising a rigidly connected outer casing and inner reflector shell to co-act with said head, and means for imparting universal movement to said lamp.

3. The combination in a dirigible head light with a fixed open center circular, concavo-convex bearing head, of a lamp having a rear opening and comprising a rigidly connected outer casing and inner reflector shell conforming to said head, and means for imparting universal movement to said lamp.

4. The combination with a pair of dirigible head lights comprising fixed bearing heads and movable lamps incasing said heads, of an actuating bar pivotally connected to said lamps, means for longitudinally moving said bar and separate means for oscillating said bar for imparting a universal movement to said lamps.

5. The combination with a pair of dirigible head lights comprising fixed bearing heads and movable lamps inclosing said heads, of an actuating rack bar having end arms pivotally connected to said lamps and an operating shaft with connections for oscillating said bar.

6. The combination with a steering post and a bevel gear thereon, of an operating member, a clutch, and a lever for manipulating said member, a slidable slotted thimble on said member, and a pin on the member engaging the slotted thimble, a bevel gear on the thimble to engage the bevel gear on the post, and means for holding these gears in engagement.

7. The combination with a pair of dirigible lamps of an actuating bar pivotally connected to said lamps, said bar having rack teeth thereon, an operating shaft pivotally connected to said actuating bar to rotate the same, an inclosing tubular casing on the shaft having a rack wheel to engage the teeth on the actuating bar, and independent levers for turning said operating shaft and tubular casing.

HEARD D. DENSON.